(12) United States Patent
Wu et al.

(10) Patent No.: US 10,187,836 B2
(45) Date of Patent: *Jan. 22, 2019

(54) VOICE RESOURCE SAVING METHOD, DEVICE, AND SYSTEM

(71) Applicant: HUAWEI TECHNOLOGIES CO., LTD., Shenzhen, Guangdong (CN)

(72) Inventors: Xiaobo Wu, Shanghai (CN); Ye Zou, Xi'an (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/385,392

(22) Filed: Dec. 20, 2016

(65) Prior Publication Data

US 2017/0105156 A1   Apr. 13, 2017

Related U.S. Application Data

(63) Continuation of application No. PCT/CN2014/080622, filed on Jun. 24, 2014.

(51) Int. Cl.
*H04W 68/02* (2009.01)
*H04W 36/14* (2009.01)
(Continued)

(52) U.S. Cl.
CPC ....... *H04W 36/14* (2013.01); *H04W 36/0022* (2013.01); *H04W 36/02* (2013.01);
(Continued)

(58) Field of Classification Search
CPC ...... H04W 36/14; H04W 68/02; H04W 36/02
See application file for complete search history.

(56) References Cited

U.S. PATENT DOCUMENTS 7,415,274 B2   8/2008   Kauranen et al.
7,885,234 B2   2/2011   Ejzak
(Continued)

FOREIGN PATENT DOCUMENTS

CN    1812601 A      8/2006
CN    101039507 A    9/2007
(Continued)

OTHER PUBLICATIONS

European Patent Application No. 16205680.8, European Extended Search Report, dated Apr. 12, 2017, 13 pages.
(Continued)

*Primary Examiner* — Chuong A Ngo
(74) *Attorney, Agent, or Firm* — Womble Bond Dickinson (US) LLP

(57) ABSTRACT

The present invention discloses a voice resource saving method, including: an MME sends a notification message to an eNodeB, which is used to instruct the eNodeB not to hand over, for a non-voice service, a UE from a LTE network to a CS domain of a 2G or a 3G network. Or, when an MSC determines that the circuit domain service is a non-voice service, the MSC sends a bearer release message to a base station to instruct the base station to release the voice resource. According to the the present invention, during implementation of a non-voice service, a handover of UE from an LTE network to a CS domain of a 2G or 3G network may not be triggered, or a voice resource reserved in the CS domain of the 2G or 3G network is released.

14 Claims, 8 Drawing Sheets

(51) Int. Cl.
*H04W 76/16* (2018.01)
*H04W 36/02* (2009.01)
*H04W 36/00* (2009.01)
*H04W 68/12* (2009.01)

(52) U.S. Cl.
CPC .......... *H04W 68/02* (2013.01); *H04W 68/12* (2013.01); *H04W 76/16* (2018.02)

(56) References Cited

U.S. PATENT DOCUMENTS

| | | | |
|---|---|---|---|
| 8,064,403 | B2 | 11/2011 | Zhao |
| 8,259,673 | B2 | 9/2012 | Diachina et al. |
| 8,284,701 | B2 | 10/2012 | Vikberg et al. |
| 8,320,291 | B2 | 11/2012 | Rune et al. |
| 8,391,241 | B2 | 3/2013 | Vikberg et al. |
| 8,493,934 | B2 | 7/2013 | Yu |
| 8,493,938 | B2 | 7/2013 | Yu |
| 8,494,536 | B2 | 7/2013 | Noguchi et al. |
| 8,496,934 | B2 | 7/2013 | Yu |
| 8,504,043 | B2 | 8/2013 | Wu et al. |
| 8,688,126 | B2 | 4/2014 | Wu et al. |
| 8,792,417 | B2 | 7/2014 | Yeoum et al. |
| 8,861,496 | B2 | 10/2014 | Yu et al. |
| 9,161,269 | B2 | 10/2015 | Yu |
| 2003/0026245 | A1 | 2/2003 | Ejzak |
| 2004/0152466 | A1 | 8/2004 | Sinnarajah et al. |
| 2007/0207806 | A1 | 9/2007 | Shaheen |
| 2007/0218903 | A1 | 9/2007 | Grech |
| 2008/0214190 | A1 | 9/2008 | Aalto |
| 2008/0233947 | A1 | 9/2008 | Herrero-Veron |
| 2008/0274736 | A1 | 11/2008 | Hu |
| 2009/0036131 | A1 | 2/2009 | Diachina et al. |
| 2010/0080171 | A1 | 4/2010 | Rune et al. |
| 2010/0172336 | A1 | 7/2010 | Pehrsson |
| 2010/0189035 | A1 | 7/2010 | Pehrsson et al. |
| 2010/0246530 | A1 | 9/2010 | Pehrsson |
| 2010/0254313 | A1 | 10/2010 | Hallenstal |
| 2010/0265884 | A1 | 10/2010 | Vikberg et al. |
| 2010/0272025 | A1* | 10/2010 | Yu ............... H04W 24/02 370/328 |
| 2010/0302937 | A1 | 12/2010 | Hu et al. |
| 2010/0303007 | A1 | 12/2010 | Witzel et al. |
| 2010/0303041 | A1 | 12/2010 | Diachina et al. |
| 2010/0309886 | A1 | 12/2010 | Vikberg et al. |
| 2011/0207481 | A1 | 8/2011 | Yin et al. |
| 2011/0274046 | A1 | 11/2011 | Rune et al. |
| 2011/0299429 | A1* | 12/2011 | Tiwari ............ H04W 36/0022 370/259 |
| 2012/0122459 | A1* | 5/2012 | Wu ............... H04W 36/0022 455/437 |
| 2012/0257600 | A1 | 10/2012 | Diachina et al. |
| 2012/0287907 | A1 | 11/2012 | Yu |
| 2013/0094472 | A1 | 4/2013 | Klingenbrunn et al. |
| 2013/0279476 | A1 | 10/2013 | Yu |

FOREIGN PATENT DOCUMENTS

| | | |
|---|---|---|
| CN | 101090567 A | 12/2007 |
| CN | 101483896 A | 7/2009 |
| CN | 101489288 A | 7/2009 |
| CN | 101816206 A | 8/2010 |
| CN | 102158922 A | 8/2011 |
| EP | 1081971 A1 | 3/2001 |
| EP | 2228970 A1 | 9/2010 |
| EP | 2683133 A1 | 1/2014 |
| EP | 2683134 A1 | 1/2014 |
| JP | 2006516870 A | 7/2006 |
| JP | 2010516167 A | 5/2010 |
| JP | 2010531566 A | 9/2010 |
| JP | 2011508496 A | 3/2011 |
| JP | 2011512065 A | 4/2011 |
| WO | 2006077555 A1 | 7/2006 |
| WO | 2007137615 A1 | 12/2007 |
| WO | 2009000315 A1 | 12/2008 |
| WO | 2009022860 A1 | 2/2009 |
| WO | 2013172656 A1 | 11/2013 |
| WO | WO 2013172656 A1 * | 11/2013 ............ H04W 48/18 |
| WO | WO-2013172656 A1 * | 11/2013 ............ H04W 48/18 |

OTHER PUBLICATIONS

"Study on Circuit Switched (CS) Domain Services Over Evolved Packet Switched (PS) Access; Stage 2," 3GPP-Standards, 2500 Wilson Boulevard, Suite 300, Arlington, Virginia 22201 USA, V1.0.0, Dec. 31, 2007.

"3rd Generation Partnership Project; Technical Specification Group Services and System Aspects; General Packet Radio Service (GPRS); Service description; Stage 2 (Release 7)," 3GPP TS 23.060, V73.6.0, pp. 1-217, 3rd Generation Partnership Project, Valbonne, France, (Dec. 2007).

"3rd Generation Partnership Project; Technical Specification Group Services and System Aspects; Circuit Switched Fallback in Evolved Packet System; Stage 2 (Release 8)," 3GPP TS 23.272, V1.1.0, pp. 1-25, 3rd Generation Partnership Project, Valbonne, France, (Apr. 2008).

3rd Generation Partnership Project; Technical Specification Group Services and System Aspects; General Packet Radio Service (GPRS) Enhancements for Evolved Universal Terrestrial Radio Access Network (E-UTRAN) Access (Release 8), 3GPP TS 23.401, V8.0.0, pp. 1-167, 3rd Generation Partnership Project, Valbonne, France (Dec. 2007).

"CS Fallback: Overview and Open Issues," 3GPP TSG-RAN WG2, Seville, Spain, R2-080027, 3rd Generation Partnership Project, Valbonne, France (Jan. 14-18, 2008).

"Fallback from eUTRAN to 2G/3G access for CS Voice Services," 3GPP TSG SA WG2 Architecture—S2#57, Orlando, Florida, S2-072521, 3rd Generation Partnership Project, Valbonne, France (Jun. 25-29, 2007).

3rd Generation Partnership Project; Technical Specification Group Services and System Aspects; Study on Circuit Switched (CS) domain services over evolved Packet Switched (PS) access; Stage 2 (Release 8), 3GPP TR 23.879, V1.0.0, pp. 1-40, 3rd Generation Partnership Project, Valbonne, France (Dec. 2007).

Notice of Allowance in corresponding U.S. Appl. No. 12/831,437 (dated Mar. 22, 2013).

First Office Action in corresponding U.S. Appl. No. 12/831,437 (dated Aug. 27, 2012).

Notice of Allowance in corresponding U.S. Appl. No. 13/557,033 (dated May 1, 2013).

First Office Action in corresponding U.S. Appl. No. 13/557,033 (dated Oct. 23, 2012).

Notice of Allowance in corresponding U.S. Appl. No. 13/924,606 (dated Jun. 5, 2015).

First Office Action in corresponding U.S. Appl. No. 13/924,606 (dated Dec. 10, 2014).

Samsung, Issues related to CSFB awareness in UMTS and GERAN [online], 3GPP TSG-RAN WG3#77 R3-121848, Aug. 4, 2012,total 7 pages.

NTT DoCoMo, MO-LR triggered CSFB while UE is in active VoIP session [online], 3GPP TSG-SA WG2#78E S2-101928, Apr. 9, 2010,total 6 pages.

* cited by examiner

VOICE RESOURCE SAVING METHOD, DEVICE, AND SYSTEM

CROSS-REFERENCE TO RELATED APPLICATIONS

This application is a continuation of International Application No. PCT/CN2014/080622, filed on Jun. 24, 2014, the disclosure of which is hereby incorporated by reference in its entirety.

TECHNICAL FIELD

The present invention relates to the field of communications technologies, and in particular, to a voice resource saving method, device and system.

BACKGROUND

Full coverage of a second generation (2G) or a third generation (3G) network such as a Global System for Mobile Communications (GSM) or Wideband Code Division Multiple Access (WCDMA) is basically implemented.

With development of Long Term Evolution (LTE) network technologies, these LTE networks already cover some urban areas and traffic hotspot areas. In this way, in current communications networks, an LTE network and a 2G or 3G network coexist.

During a call, user equipment (UE) may enter a 2G or 3G network from an LTE network. Because the LTE network and the 2G or 3G network have different bearer mechanisms, the user equipment needs to be handed over from a packet switched (PS) domain to a circuit switched (CS) domain. Therefore, a voice call may be interrupted, affecting continuity of the voice call of a user.

A circuit switched fallback (CSFB) refers to that when user equipment (UE) in coverage of LTE processes a voice service, the UE first falls back to a network having a CS domain and processes the voice service in the network having a CS domain. In this way, an objective of reusing an existing CS domain device to provide a conventional voice service to a user in an LTE network is achieved. In the prior art, the UE needs to be handed over from the LTE network to a PS domain of the 2G or 3G network or be redirected from the LTE network to the 2G or 3G network, and then initiate, in the 2G or 3G network, a connection to a CS domain.

In the prior art, a CSFB process includes a CSFB for a voice service and a CSFB for a non-voice service. However, in the prior art, voice resource waste is caused during implementation of a CSFB service for a non-voice service.

SUMMARY

For the foregoing problem in the prior art, embodiments of the present invention provide a voice resource saving method. During implementation of a CSFB for a non-voice service, a handover of UE from an LTE network to a CS domain of a 2G or 3G network is not triggered, or a handover of UE from an LTE network to a CS domain of a 2G or 3G network is triggered. When the UE is moved to the CS domain of the 2G or 3G network, a voice resource reserved in the CS domain of the 2G or 3G network is released. The embodiments of the present invention further provide a corresponding device and system.

A first aspect of the present invention provides a voice resource saving method, including:

receiving, by a mobility management entity (MME), a first paging request message that is sent by a mobile switching center (MSC) and that is used to page a user equipment (UE), where the first paging request message includes first indication information, and the first indication information is used to indicate a non-voice service; and sending, by the MME, a notification message to an evolved NodeB (eNodeB) according to the first paging request message, where the notification message is used to instruct the eNodeB not to hand over, for the non-voice service, the UE from a Long Term Evolution (LTE) network to a circuit switched (CS) domain of a second generation (2G) or a third generation (3G) network.

With reference to the first aspect, in a first possible implementation manner, the notification message includes second indication information, and the second indication information is used to indicate the non-voice service.

With reference to the first aspect or the first possible implementation manner of the first aspect, in a second possible implementation manner, the method further includes:

sending, by the MME, a second paging request message to the UE; and receiving, by the MME, a service request sent by the UE, where the service request is used to request a circuit switched fallback (CSFB) for a circuit domain service.

A second aspect of the present invention provides a voice resource saving method, including:

receiving, by an evolved NodeB eNodeB located in a Long Term Evolution LTE network, a notification message sent by a mobility management entity MME, where the notification message is used to instruct the eNodeB not to hand over, for a non-voice service, a user equipment UE from the LTE network to a CS domain of a second generation 2G or a third generation 3G network; and sending, by the eNodeB to the MME according to the notification message, a handover required message for a handover from the LTE network to a packet switched PS domain of the 2G or 3G network, or sending, by the eNodeB, a redirection request to the UE.

With reference to the second aspect, in a first possible implementation manner, the notification message includes second indication information, and the second indication information is used to indicate the non-voice service.

A third aspect of the present invention provides a voice resource saving method, including:

receiving, by a mobile switching center MSC, a first handover request message sent by a mobility management entity MME, where the first handover request message is used to request the MSC to hand over, for a circuit domain service, a user equipment UE from a Long Term Evolution LTE network to a circuit switched CS domain of a second generation 2G or a third generation 3G network;

sending, by the MSC, a second handover request message to a base station of the 2G or 3G network, where the second handover request message is used to request the base station to allocate a voice resource to the circuit domain service;

receiving, by the MSC, a handover complete message sent by the base station;

determining, by the MSC, whether the circuit domain service is a non-voice service; and when the MSC determines that the circuit domain service is a non-voice service, sending, by the MSC, a bearer release message to the base station to instruct the base station to release the voice resource.

With reference to the third aspect, in a first possible implementation manner, the method further includes:

receiving, by the MSC, a service connection setup request message sent by the UE, where the service connection setup request message indicates that the circuit domain service is a non-voice service; and the determining, by the MSC, whether the circuit domain service is a non-voice service includes:

determining, by the MSC according to the service connection setup request message, that the circuit domain service is a non-voice service.

With reference to the third aspect, in a second possible implementation manner, the determining, by the MSC, whether the circuit domain service is a non-voice service includes:

determining, by the MSC according to a type of the circuit domain service, that the circuit domain service is a non-voice service; and the method further includes:

sending, by the MSC, a service connection setup request message to the UE, where the service connection setup request message indicates that the circuit domain service is a non-voice service.

With reference to the third aspect or the first or the second possible implementation manner of the third aspect, in a third possible implementation manner, the method further includes:

when the MSC determines that the circuit domain service is a non-voice service, sending, by the MSC, a session release message to the UE, where the session release message is used to request the UE to release a voice session that was generated in a process in which the UE was handed over from the LTE network to the CS domain of the 2G or 3G network.

A fourth aspect of the present invention provides a voice resource saving method, including:

sending, by a user equipment UE located in a Long Term Evolution LTE network, a request message to a mobility management entity MME, where the request message is used to request a circuit switched fallback CSFB for a circuit domain service;

receiving, by the UE, a handover command sent by an evolved NodeB eNodeB, where the handover command is used to instruct the UE to be handed over, for the CSFB, from the LTE network to a circuit switched CS domain of a second generation 2G or a third generation 3G network, and the handover command includes information about a voice resource that is allocated by the 2G or 3G network for the handover of the UE from the LTE network to the CS domain of the 2G or 3G network;

sending, by the UE, a handover complete message to a base station in the 2G or 3G network; and receiving, by the UE, a bearer release message sent by the base station, where the bearer release message is used to instruct the base station to release the voice resource.

With reference to the fourth aspect, in a first possible implementation manner, after the sending, by the UE, a handover complete message to a base station in the 2G or 3G network, and before the receiving, by the UE, a bearer release message sent by the base station, the method further includes:

sending, by the UE, a service connection setup request message to the MSC, where the service connection setup request message indicates that the circuit domain service is a non-voice service, or receiving, by the UE, a service connection setup request message sent by the MSC, where the service connection setup request message indicates that the circuit domain service is a non-voice service.

With reference to the fourth aspect or the first possible implementation manner of the fourth aspect, in a second possible implementation manner, the method further includes:

receiving, by the UE, a session release message sent by the MSC, where the session release message is used to request the UE to release a voice session that was generated in a process in which the UE was handed over from the LTE network to the CS domain of the 2G or 3G network.

A fifth aspect of the present invention provides a mobility management entity MME, including:

a receiving unit, configured to receive a first paging request message that is sent by a mobile switching center MSC and that is used to page a user equipment UE, where the first paging request message includes first indication information, and the first indication information is used to indicate a non-voice service; and a sending unit, configured to send a notification message to an evolved NodeB eNodeB according to the first paging request message received by the receiving unit, where the notification message is used to instruct the eNodeB not to hand over, for the non-voice service, the UE from a Long Term Evolution LTE network to a circuit switched CS domain of a second generation 2G or a third generation 3G network. With reference to the fifth aspect, in a first possible implementation manner, the notification message includes second indication information, and the second indication information is used to indicate the non-voice service.

With reference to the fifth aspect or the first possible implementation manner of the fifth aspect, in a second possible implementation manner, the sending unit is further configured to send a second paging request message to the UE; and the receiving unit is further configured to receive a service request sent by the UE, where the service request is used to request a circuit switched fallback CSFB for a circuit domain service.

A sixth aspect of the present invention provides an evolved NodeB eNodeB, including:

a receiving unit, configured to receive a notification message sent by a mobility management entity MME, where the notification message is used to instruct the eNodeB not to hand over, for a non-voice service, a user equipment UE from a Long Term Evolution LTE network to a CS domain of a second generation 2G or a third generation 3G network; and a sending unit, configured to send, to the MME according to the notification message received by the receiving unit, a handover required message for a handover from the LTE network to a packet switched PS domain of the 2G or 3G network, or send a redirection request to the UE.

With reference to the sixth aspect, in a first possible implementation manner, the notification message includes second indication information, and the second indication information is used to indicate the non-voice service.

A seventh aspect of the present invention provides a mobile switching center MSC, including: a receiving unit, a sending unit, and a processing unit, where the receiving unit is configured to receive a first handover request message sent by a mobility management entity MME, where the first handover request message is used to request the MSC to hand over, for a circuit domain service, a user equipment UE from a Long Term Evolution LTE network to a circuit switched CS domain of a second generation 2G or a third generation 3G network;

the sending unit is configured to send a second handover request message to a base station of the 2G or 3G network, where the second handover request message is used to request the base station to allocate a voice resource to the circuit domain service;

the receiving unit is further configured to receive a handover complete message sent by the base station;

the processing unit is configured to: after the receiving unit receives the handover complete message, determine whether the circuit domain service is a non-voice service; and the sending unit is configured to: when the processing unit determines that the circuit domain service is a non-voice service, send a bearer release message to the base station to instruct the base station to release the voice resource.

With reference to the seventh aspect, in a first possible implementation manner, the receiving unit is further configured to receive a service connection setup request message sent by the UE, where the service connection setup request message indicates that the circuit domain service is a non-voice service; and the processing unit is configured to determine, according to the service connection setup request message received by the receiving unit, that the circuit domain service is a non-voice service.

With reference to the seventh aspect, in a second possible implementation manner, the processing unit is configured to determine, according to a type of the circuit domain service, that the circuit domain service is a non-voice service; and the sending unit is further configured to send a service connection setup request message to the UE, where the service connection setup request message indicates that the circuit domain service is a non-voice service.

With reference to the seventh aspect or the first or the second possible implementation manner of the seventh aspect, in a third possible implementation manner, the sending unit is further configured to: when the processing unit determines that the circuit domain service is a non-voice service, send a session release message to the UE, where the session release message is used to request the UE to release a voice session that was generated in a process in which the UE was handed over from the LTE network to the CS domain of the 2G or 3G network.

An eighth aspect of the present invention provides a user equipment UE located in a Long Term Evolution LTE network, including:

a sending unit, configured to send a request message to a mobility management entity MME, where the request message is used to request a circuit switched fallback CSFB for a circuit domain service; and a receiving unit, configured to receive a handover command sent by an evolved NodeB eNodeB, where the handover command is used to instruct the UE to be handed over, for the CSFB, from the LTE network to a circuit switched CS domain of a second generation 2G or a third generation 3G network, and the handover command includes information about a voice resource that is allocated by the 2G or 3G network for the handover of the UE from the LTE network to the circuit switched CS domain of the 2G or 3G network, where the sending unit is further configured to send a handover complete message to the base station; and the receiving unit is further configured to receive a bearer release message sent by the base station, where the bearer release message is used to instruct the base station to release the voice resource.

With reference to the eighth aspect, in a first possible implementation manner, the sending unit is further configured to: after the handover complete message is sent to the base station in the 2G or 3G network, and before the receiving unit receives the bearer release message sent by the base station, send a service connection setup request message to the MSC, where the service connection setup request message indicates that the circuit domain service is a non-voice service, or the receiving unit is further configured to: after the sending unit sends the handover complete message to the base station, and before the bearer release message sent by the base station is received, receive a service connection setup request message sent by the MSC, where the service connection setup request message indicates that the circuit domain service is a non-voice service.

With reference to the eighth aspect or the first possible implementation manner of the eighth aspect, in a second possible implementation manner, the receiving unit is further configured to receive a session release message sent by the MSC, where the session release message is used to request the UE to release a voice session that was generated in a process in which the UE was handed over from the LTE network to the CS domain of the 2G or 3G network.

A ninth aspect of the present invention provides a voice resource saving system, including:

a mobility management entity MME, a mobile switching center MSC, and an evolved NodeB (eNodeB), where the MME receives a first paging request message that is sent by the MSC and that is used to page a user equipment UE, where the first paging request message includes first indication information, and the first indication information is used to indicate a non-voice service; and the MME sends a notification message to the eNodeB according to the first paging request message, where the notification message is used to instruct the eNodeB not to hand over, for the non-voice service, the UE from a Long Term Evolution LTE network to a CS domain of a second generation 2G or a third generation 3G network;

the eNodeB receives the notification message sent by the MME; and the eNodeB sends, to the MME according to the notification message, a handover required message for a handover from the LTE network to a packet switched PS domain of the 2G or 3G network, or sending, by the eNodeB, a redirection request to the UE.

A tenth aspect of the present invention provides a voice resource saving system, including:

a mobility management entity MME, a mobile switching center MSC, an evolved NodeB (eNodeB), a base station of a second generation 2G or a third generation 3G network, where a user equipment UE located in a Long Term Evolution LTE network sends a request message to the MME, where the request message is used to request a circuit switched fallback CSFB for a circuit domain service;

the MSC receives a first handover request message sent by the MME, where the first handover request message is used to request the MSC to hand over, for the circuit domain service, the UE from the LTE network to a CS domain of the 2G or 3G network;

the MSC sends a second handover request message to the base station, where the second handover request message is used to request the base station to allocate a voice resource to the circuit domain service;

the UE receives a handover command sent by the eNodeB, where the handover command is used to instruct the UE to be handed over, for the CSFB, from the LTE network to the circuit switched CS domain of the 2G or 3G network, and the handover command includes information about the voice resource;

the UE sends a handover complete message to the base station:

the MSC receives a handover complete message sent by the base station;

the MSC determines whether the circuit domain service is a non-voice service; and when the MSC determines that the circuit domain service is a non-voice service, the MSC sends a bearer release message to the base station to instruct the base station to release the voice resource.

By means of the embodiments provided in the present invention, during implementation of a circuit switched fallback for a non-voice service, a handover of UE from an LTE network to a CS domain of a 2G or 3G network is not triggered, or a handover of UE from an LTE network to a CS domain of a 2G or 3G network is triggered, and when the UE is moved to the CS domain of the 2G or 3G network, a voice resource reserved in the CS domain of the 2G or 3G network is released, thereby saving voice resources.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings without creative efforts.

DESCRIPTION OF EMBODIMENTS

The embodiments of the present invention provide a voice resource saving method. During implementation of a CSFB for a non-voice service, a handover of UE from an LTE network to a CS domain of a 2G or 3G network is not triggered, or a handover of UE from an LTE network to a CS domain of a 2G or 3G network is triggered, and when the UE is moved to the CS domain of the 2G or 3G network, a voice resource reserved in the CS domain of the 2G or 3G network is released. The embodiments of the present invention further provide a corresponding device and system. Detailed descriptions are provided below separately.

Some communications terms involved in the embodiments of the present invention and abbreviations thereof include: a mobility management entity (MME), an evolved NodeB (eNodeB), user equipment (UE), a mobile switching center (MSC), a second generation or a third generation (2rd Generation/3rd Generation, 2G or 3G) mobile communication technology, a base station (BS), where the base station in the embodiments of the present invention includes a base station controller (BSC) and a radio network controller (RNC), Long Term Evolution (LTE), a serving general packet radio service (GPRS) support node (SGSN), a circuit switched fallback (CSFB), a universal terrestrial radio access network (UTRAN), a Global System for Mobile Communications (GSM), Enhanced Data rates for GSM Evolution (EDGE), and a Global System for Mobile Communications/Enhanced Data rates for GSM Evolution radio access network (GSM/EDGE Radio Access Network, GERAN).

First, second, third, fourth, fifth, and the like in the embodiments of the present invention are merely used to distinguish different indication information, messages or other objects, and do not represent a sequential relationship.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Figure 1:
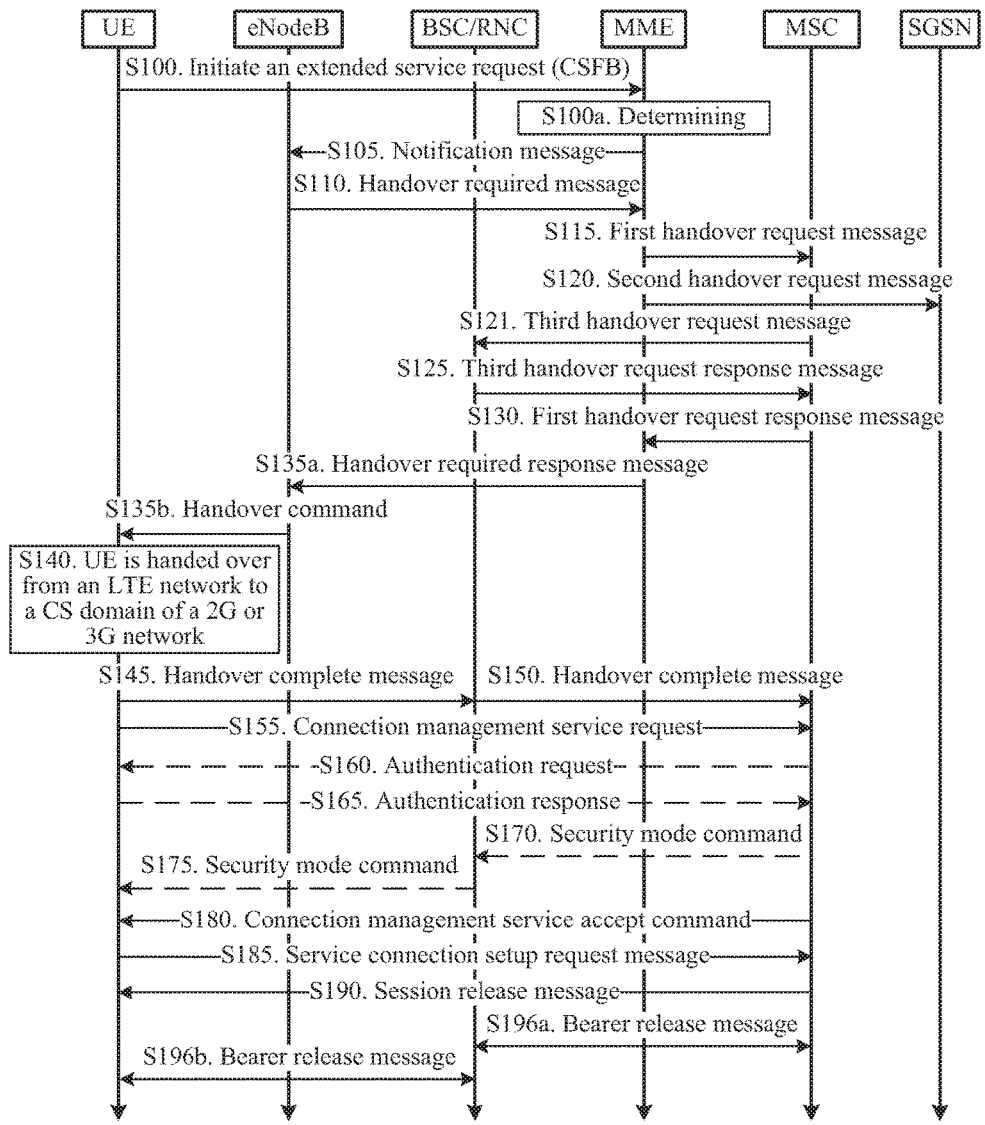
FIG. 1 is a schematic diagram of an embodiment of a voice resource saving method according to the embodiments of the present invention.

Referring to FIG. 1, FIG. 1 shows a voice resource saving process in a circuit switched fallback network handover for a non-voice service and a calling process after the handover according to an embodiment of the present invention.

S100: UE sends, to an MME, an extended service request, where the extended service request is used to request a circuit switched fallback CSFB.

S100a: The MME may determine whether an LTE network and a 2G or 3G network support a handover, for the CSFB, of the UE from the LTE network to a CS domain of the 2G or 3G network.

The MME may not perform determining, but consider by default that a communications network supports the handover, for the CSFB, of the UE from the LTE network to the CS domain of the 2G or 3G network; or perform determining on only some networks.

The communications network refers to the LTE network and the 2G or 3G network.

S105: The MME sends a notification message to an evolved NodeB eNodeB according to the extended service request, where the notification message is used to instruct the eNodeB to move, for the CSFB, the UE from the LTE network to the CS domain of the 2G or 3G network, that is, the notification message is used to indicate to the eNodeB that the UE should be moved to the 2G or 3G network for the CSFB.

When the MME determines that the LTE network and 2G or 3G network support the handover, for the CSFB, of the UE from the LTE network to the CS domain of the 2G or 3G network, the MME may send the notification message to inform the eNodeB whether the LTE network and 2G or 3G network support the handover, for the CSFB, of the UE from the LTE network to the CS domain of the 2G or 3G network, so that the eNodeB initiates a handover requirement for handing over, for the CSFB, the UE from the LTE network to the CS domain of the 2G or 3G network.

For example, the notification message may include indication information, to indicate, by using the indication information, that the communications network and the UE support the handover, for the CSFB, of the UE from the LTE network to the CS domain of the 2G or 3G network.

For example, the indication information may be indication information of a single radio voice call continuity (SRVCC) handover, to indicate that the LTE network and the 2G or 3G network support the handover, for the CSFB, of the UE from the LTE network to the 2G or 3G network.

The indication information in this embodiment of the present invention may be referred to as an optimized CSFB indicator, a single radio voice call continuity (SRVCC) CSFB based indicator, an enhanced CSFB indicator, an enhanced CSFB possibility indicator, or an SRVCC operation possibility indicator.

S110: The eNodeB sends a handover (HO) required message to the MME.

The handover required message may be a handover required message for a handover from the LTE network to a packet switched PS domain of the 2G or 3G network (such as an LTE to 2G or 3G PS HO Required message), or a handover required message for the handover from the LTE network to the CS domain of the 2G or 3G network (such as an LTE to 2G or 3G SRVCC HO Required message), or a handover required message for a handover from the LTE network to a PS domain and the CS domain of the 2G or 3G network (such as an LTE to 2G or 3G SRVCC and PS HO Required message).

The handover required message may include capability information of the UE, to indicate information about a frequency band supported by the UE, an access capability of the UE, and the like. For example, the capability information of the UE may be at least one of a classmark 2 or a classmark 3. In the prior art, when the UE does not support a handover from the LTE network to the CS of the 2G or 3G network, the eNodeB does not send the capability information of the UE to the MME. Therefore, the MME does not have the capability information of the UE. However, after the MME obtains the capability information of the UE, the MME may send the capability information of the UE to the MSC, so that the MSC can execute the handover to the CS of the 2G or 3G. In this embodiment of the present invention, the capability information of the UE may be transferred to the MME by using the handover request message.

The handover required message includes first indication information, and the first indication information is used to request the MME to hand over, for the CSFB, the UE from the LTE network to the CS domain of the 2G or 3G network.

Alternatively, the first indication information is used to request the MME to hand over, for the CSFB, the UE from the LTE network to the CS domain of the 2G or 3G network, and indicate that the UE supports the handover from the LTE network to the CS domain of the 2G or 3G network.

Alternatively, the handover required message includes a source-to-target transparent container. The source-to-target transparent container includes second indication information, and the second indication information is used to request a base station of the 2G or 3G network to hand over, for the CSFB, the UE from the LTE network to the CS domain of the 2G or 3G network.

The first indication information may be referred to as a CSFB indicator, an optimized CSFB indicator, an SRVCC based CSFB indicator, an enhanced CSFB indicator, or an enhanced CSFB possibility indicator.

When the second indication information does not indicate that the UE supports the handover from the LTE network to the CS domain of the 2G or 3G network, the MME may consider by default that the UE supports the handover. When the first indication information does not indicate that the UE supports the handover from the LTE network to the CS domain of the 2G or 3G network, the base station of the 2G or 3G network may consider by default that the UE supports the handover. The second indication information and the first indication information may be referred to as CSFB indicators, optimized CSFB indicators, SRVCC based CSFB indicators, enhanced CSFB indicators, or enhanced CSFB possibility indicators.

For example, the second indication information may include a CSFB indicator field, or a CSFB indicator field and a UE capability field. The CSFB indicator field instructs the MME to hand over, for the CSFB, the UE from the LTE network to the circuit switched CS domain of the 2G or 3G network. The UE capability field represents that the UE supports the handover from the LTE network to the PS domain of the 2G or 3G network.

The first indication information may include a CSFB indicator field, or a CSFB indicator field and a UE capability field. The CSFB indicator field instructs the base station of the 2G or 3G network to hand over, for the CSFB, the UE from the LTE network to the circuit switched CS domain of the 2G or 3G network. The UE capability field represents that the UE supports the handover from the LTE network to the PS domain of the 2G or 3G network.

For example:

a) When a target network is a UTRAN network, the eNodeB adds the second indication information to a source RNC to target RNC transparent container. A CSFB information field in the existing source RNC to target RNC transparent container may be used as the CSFB indicator field, and a field may be added to the source RNC to target RNC transparent container as the UE capability field.

b) When a target network is a GERAN network, the eNodeB adds the second indication information to old base station subsystem (BSS) as new BSS information. The CSFB indicator field or the UE capability field may be added to the old BSS as new BSS information.

S115: The MME sends a first handover request message to an MSC, where the first handover request message is used to request the MSC to hand over, for a circuit domain service, the user equipment UE from the Long Term Evolution LTE network to the circuit switched CS domain of the second generation 2G or the third generation 3G network.

Because the first handover request message is sent by the MME to the MSC, a handover required by the first handover request message is the handover from the LTE network to the CS domain of the 2G or 3G network. That is, the first handover request is a request for a PS-to-CS handover.

The first handover request message may carry third indication information, and the third indication information is used to request the MSC to hand over, for the CSFB, the UE from the LTE network to the CS domain of the 2G or 3G network. That is, the third indication information is used to represent that the first handover request is sent for the CSFB. The third indication information may further indicate that the UE supports the handover from the LTE network to the CS domain of the 2G or 3G network. The first handover request message may not indicate the CSFB, and in this case, the MSC considers by default that the first handover request is sent for the CSFB.

After the MME receives the capability information of the UE from the eNodeB, the first handover request message may carry the capability information of the UE. For example, the capability information is at least one of the classmark classmark2 or the classmark classmark3.

Because the UE does not support the handover from the LTE network to the CS domain of the 2G or 3G network, the UE does not report voice coding/decoding information supported by the UE. In this case, the MME may add default voice coding/decoding information to the first handover request message according to a handover target system.

The third indication information in the first handover request message may be referred to as a CSFB indicator, an optimized CSFB indicator, a single radio voice call continuity (SRVCC) CSFB based indicator, an enhanced CSFB indicator, or an enhanced CSFB possibility indicator.

When the first handover request message carries a Session Transfer Number-Single Radio (STN-SR), the MSC ignores the STN-SR number.

S120: The MME sends a second handover request message to an SGSN, where the second handover request message is used to request the SGSN to initiate a handover from the LTE network to a packet switched PS domain of the 2G or 3G network.

When handed over from the LTE network to the CS domain, the UE may be handed over to the PS domain simultaneously, or may not be handed over to the PS domain simultaneously. In this way, a network dependence degree of this solution can be reduced, that is, an operator is only required to support the handover from the LTE to the CS domain of the 2G or 3G network, and the operator does not need to support the handover from the LTE to the PS domain of the 2G or 3G network.

S121: The MSC sends a third handover request message to a base station (a BSC/an RNC), where the third handover request message is used to request the base station to allocate a voice resource to the circuit domain service.

The third handover request message is further used to request the base station to hand over, for the CSFB, the user equipment UE from the Long Term Evolution LTE network to the circuit switched CS domain of the 2G or 3G network. The base station allocates a CS domain resource for the handover of the UE from the LTE network to the CS domain of the 2G or 3G network. For example, the CS domain resource allocated by the base station includes a wire resource between the base station and the MSC and a radio resource between the base station and the UE.

For example, the third handover request message includes fifth indication information, and the fifth indication information is used to request the base station to hand over, for the CSFB, the UE from the LTE network to the CS domain, and/or the fifth indication information is used to indicate that the UE supports the handover from the LTE network to the CS domain of the 2G or 3G network.

The third handover request message includes a source-to-target transparent container, and the source-to-target transparent container includes the fifth indication information.

When the first handover request message includes no voice coding/decoding information supported by the UE, the MSC sets default voice coding/decoding information according to a type of the 2G or 3G network.

The default voice coding/decoding information may be included in the third handover request message.

The third handover request message includes integrity protection information and/or encryption information, so that the base station sends a security mode command to the UE after receiving a handover complete message.

S125: The base station sends a third handover request response message to the MSC, where the third handover request response message includes information about a radio resource of the CS domain, and the information about the radio resource of the CS domain is used for handing over the UE from the LTE network to the CS domain of the 2G or 3G network.

S130: The MSC sends a first handover response message to the MME, where the first handover response message includes the information about the radio resource of the CS domain.

S135a: The MME sends a handover required response message to the eNodeB, where the handover required response message includes the information about the radio resource of the CS domain.

S135b: The eNodeB sends a handover command to the UE, where the handover command includes the information about the radio resource of the CS domain.

The UE receives the handover command sent by the evolved NodeB eNodeB. The handover command is used to instruct the UE to be handed over, for the CSFB, from the LTE network to the circuit switched CS domain of the 2G or 3G network, and the handover command includes information about the voice resource that is allocated by the 2G or 3G network for the handover of the UE from the LTE network to the CS domain of the 2G or 3G network.

For example, the handover command includes fourth indication information, and the fourth indication information is used to instruct the UE to be handed over, for the CSFB, from the LTE network to the CS domain of the 2G or 3G network.

For example, the handover command further includes information about a PS domain resource, and the UE is handed over from the LTE network to the PS domain of the 2G or 3G network according to the information about the PS domain resource.

The handover command may be further used to instruct the UE to be handed over from the LTE network to the PS domain of the 2G or 3G network.

S140: The UE is handed over from the LTE network to the CS domain of the 2G or 3G network according to the handover command.

The UE is handed over, for the CSFB, from the LTE network to the CS domain of the 2G or 3G network by using resource information included in the handover command.

The UE generates a session in a process in which the UE is handed over from the LTE network to the CS domain of the 2G or 3G network. The UE may not generate a session in the process in which the UE is handed over from the LTE network to the CS domain of the 2G or 3G network.

When the resource information includes a CS encryption algorithm identifier, the UE activates CS domain encryption according to the CS encryption algorithm identifier in the process in which the UE is handed over from the LTE network to the 2G network or 3G network.

S145: After the UE is handed over, the UE sends a handover complete (HO Complete) message to the base station (the BSC or RNC).

After receiving the handover complete message, in response to the handover complete message, the base station needs to add a Location Area Identity (LA) to UTRAN mobility information sent to the UE, which may cause the UE to initiate location area update (LAU) in this embodiment, thereby causing a CS call setup failure. To avoid the failure, the base station may not add the Location Area Identity to the UTRAN mobility information sent to the UE.

The base station may send the LAI to the UE in a subsequent process of sending the UTRAN mobility information. For example, the following methods may be used:

a) after receiving the handover complete message, the base station enables a timer, and after the timer expires, the base station sends the UTRAN mobility information, to send the LAI to the UE; or b) after receiving a call IU release command or a call connect message, the base station sends the UTRAN mobility information, to send the LAI to the UE. In a calling process, the MSC sends a call connect message to the UE; and in a called process, the UE sends a call connect message to the MSC.

Alternatively, when the UE sends a LAU message to the base station, to avoid the failure, the base station does not send a location update request message to the MSC, and the base station directly sends a location update accept message to the UE.

S150: The base station forwards the handover complete message in step S145 to the MSC.

After receiving the handover complete message sent by the base station, the MSC determines whether the circuit domain service is a non-voice service. When the MSC determines that the circuit domain service is a non-voice service, the MSC sends a bearer release message to the base station to instruct the base station to release the voice resource.

To understand a specific determining process and a specific process of releasing the voice resource, refer to S155 to S196b.

S155: The UE sends, to the MSC, a connection management service request, for example, a CM Service Request message.

S160: The MSC sends an authentication request to the UE.

Step S160 may not be performed, that is, the MSC does not send an authentication request message to the UE.

S165: The UE sends an authentication response to the MSC.

S170: The MSC sends a security mode command to the base station, where the security mode command carries integrity protection information and/or encryption information, so that the base station sends a security mode command to the UE.

Step S170 may not be performed, that is, the MSC does not send the security mode command to the base station.

S175: The base station sends the security mode command to the UE. Specifically, the base station performs this step according to the security mode command in step S170, or the base station performs this step after receiving the message in S145.

S180: Optionally, the MSC sends a connection management service accept command to the UE.

S185: The UE sends a service connection setup request message to the MSC, where the service connection setup request message is used to request the MSC to create a non-voice service, such as a location service (LCS) or an unstructured supplementary data service (Unstructured Supplementary Service Data, USSD) for the CSFB.

Optionally, the UE may receive a service connection setup request message sent by the MSC. The service connection setup request message indicates that the circuit domain service is a non-voice service.

Optionally, the MSC receives a service connection setup request message sent by the UE. The service connection setup request message indicates that the circuit domain service is a non-voice service.

The determining, by the MSC, whether the circuit domain service is a non-voice service may include:

determining, by the MSC according to the service connection setup request message, that the circuit domain service is a non-voice service.

Optionally, the determining, by the MSC, whether the circuit domain service is a non-voice service may include:

determining, by the MSC according to a type of the circuit domain service, that the circuit domain service is a non-voice service.

The method may further include:

sending, by the MSC, a service connection setup request message to the UE, where the service connection setup request message indicates that the circuit domain service is a non-voice service.

S190: After the MSC receives the service connection setup request or the connection management service request, the MSC sends a session release message (such as a Disconnect message) to the UE, where the session release message is used to request the UE to release a session that was generated in a process in which the UE was handed over from the LTE network to the CS domain of the 2G or 3G network.

The UE receives the session release message sent by the MSC. The session release message is used to request the UE to release a voice session that was generated in the process in which the UE was handed over from the LTE network to the CS domain of the 2G or 3G network.

After the UE receives the session release message sent by the MSC, the UE sends a session release request message (such as a Release message).

After receiving the session release request message, the MSC sends a session release request complete message (such as a Release complete message).

Optionally, when the MSC determines that the circuit domain service is a non-voice service, the MSC sends a session release message to the UE, where the session release message is used to request the UE to release a voice session that was generated in a process in which the UE was handed over from the LTE network to the CS domain of the 2G or 3G network.

S196a: The MSC sends a bearer release message to the base station (the BSC/RNC) of the 2G or 3G network, so that the base station releases the voice resource of the CS domain that is allocated in step S121 by the base station for the handover of the UE to the CS domain of the 2G or 3G network.

S196b: The base station of the 2G or 3G network sends the bearer release message to the UE, so that the UE releases the voice resource of the CS domain that is allocated by the base station for the handover of the UE to the CS domain of the 2G or 3G network.

Further, a callee picks up a phone to enter a conversation state.

After a call end is ended, because the call is triggered by the CSFB, the UE needs to return to the LTE network after the call is completed. The base station determines, according to the third handover request message, that the call is triggered by the CSFB. After the base station of the 2G or 3G network receives a call release message sent by the MSC, the base station of the 2G or 3G network redirects the UE to the LTE network, or the base station hands over the UE to the LTE network. The call release message is a release command Iu Release Command or a clear command Clear Command.

It should be noted that in this embodiment, the base station may parse CS signaling between the UE and the MSC. The base station receives a signaling message that is sent by the UE to the MSC, such as a connection management service request, an authentication response, a first CS call connection setup request message, or another signaling message. The base station may send the signaling message to the MSC by using a connection that is set up in a process of the handover from the LTE network to the CS domain of the 2G or 3G network, or send the signaling message to the MSC by using a direct transfer message.

In this embodiment, the indication information, first indication information, second indication information, third indication information, fourth indication information, and fifth indication information that are included in the notification message each may include a CSFB indicator field, or a CSFB indicator field and a UE capability field. The CSFB indicator field instructs the MME or the MSC or the base station of the 2G or 3G network to hand over, for the CSFB, the UE from the LTE network to the circuit switched CS domain of the 2G or 3G network. The UE capability field represents that the UE supports the handover from the LTE network to the PS domain of the 2G or 3G network.

In FIG. 1, during implementation of a circuit switched fallback for a non-voice service, a handover of UE from an LTE network to a CS domain of a 2G or 3G network is triggered. When the UE is moved to the CS domain of the 2G or 3G network, a voice resource reserved in the CS domain of the 2G or 3G network is released, thereby saving voice resources.

Figure 2A:
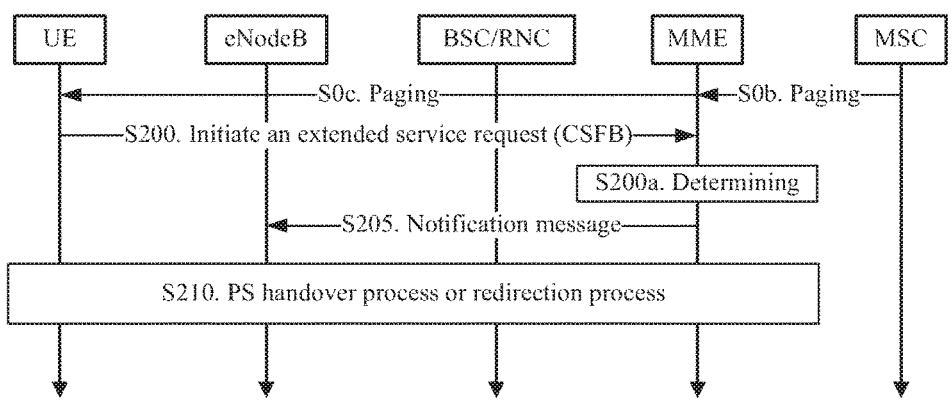
FIG. 2a is a schematic diagram of another embodiment of a voice resource saving method according to the embodiments of the present invention.

Referring to FIG. 2a, FIG. 2a shows a voice resource saving process in a circuit switched fallback network handover for a non-voice service and a called process after the handover according to an embodiment of the present invention.

S0b to S0c: An MSC sends a CS paging request to an MME, and the MME triggers a paging process.

Optionally, the MSC sends a paging message to the MME. The paging message indicates that this service is a non-voice service, such as a USSD service or an LCS service.

S200 is the same as S100, and S200a is the same as S100a. Details are not described herein again.

S205: The MME sends a notification message to an evolved NodeB eNodeB, where the notification message is used to instruct the eNodeB not to hand over, for the non-voice service, the UE from a Long Term Evolution LTE network to a CS domain of a second generation 2G or a third generation 3G network.

S210: The eNodeB sends a handover required message to the MME, where the handover required message is used to request to move the UE from the LTE network to a PS domain of the 2G or 3G network, or the eNodeB moves the UE to the 2G or 3G network by using a redirection procedure.

Instead of using a process of a handover from the LTE network to the CS domain of the 2G or 3G network to move the UE to the 2G or 3G network, the eNodeB uses a handover from the LTE network to the PS domain of the 2G or 3G network or uses the redirection procedure to move the UE to the 2G or 3G network.

In FIG. 2a, during implementation of a circuit switched fallback for a non-voice service, a handover of UE from an LTE network to a CS domain of a 2G or 3G network is not triggered, thereby saving voice resources.

Figure 2B:
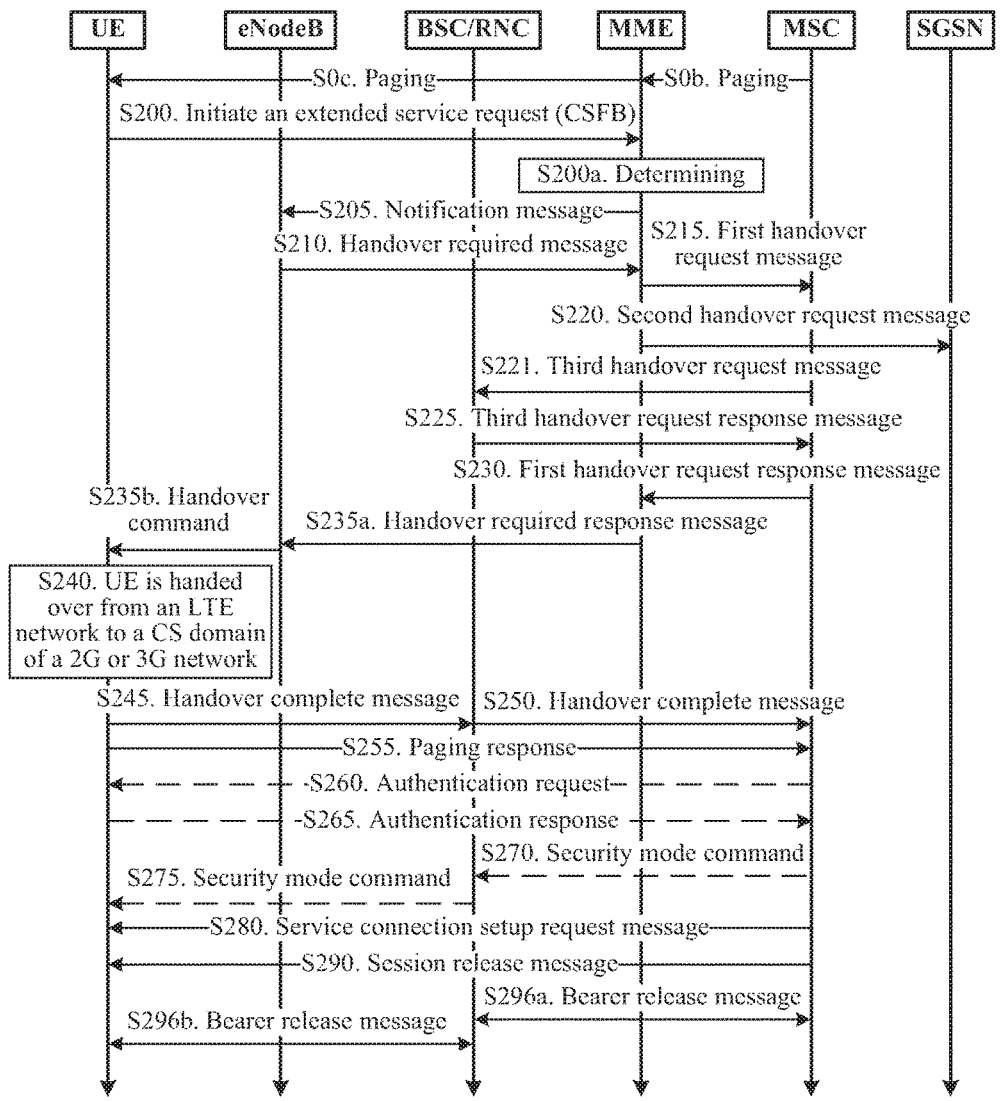
FIG. 2b is a schematic diagram of another embodiment of a voice resource saving method according to the embodiments of the present invention.

Referring to FIG. 2b, FIG. 2b shows a voice resource saving process in a circuit switched fallback network handover for a non-voice service and a called process after the handover according to an embodiment of the present invention.

S0b to S0c: An MSC sends a CS paging request to an MME, and the MME triggers a paging process.

Optionally, the MSC sends a paging message to the MME. The paging message indicates that this service is a non-voice service, such as a USSD service or an LCS service.

Step S200 to Step S250 are the same as step S100 to step S150 in FIG. 1, and details are not described herein again.

S255: Optionally, UE sends a paging response to the MSC.

S260: The MSC sends an authentication request to the UE.

Step S260 may not be performed, that is, the MSC does not send an authentication request message to the UE.

S265: The UE sends an authentication response to the MSC.

S270: The MSC sends a security mode command to the base station, where the security mode command carries integrity protection information and/or encryption information, so that the base station sends a security mode command to the UE.

Step S270 may not be performed, that is, the MSC does not send the security mode command to the base station.

S275: The base station sends the security mode command to the UE. Specifically, the base station performs this step according to the security mode command in step S270, or the base station performs this step after receiving the message in S245.

S280: The MSC sends a service connection setup request message to the UE, where the service connection setup request message is used to request the MSC to create a non-voice service, such as a location service (LCS) or an unstructured supplementary data service (Unstructured Supplementary Service Data, USSD) for the CSFB.

Optionally, the UE may receive a service connection setup request message sent by the MSC. The service connection setup request message indicates that the circuit domain service is a non-voice service.

Optionally, the MSC receives a service connection setup request message sent by the UE. The service connection setup request message indicates that the circuit domain service is a non-voice service.

The determining, by the MSC, whether the circuit domain service is a non-voice service may include:

determining, by the MSC according to the service connection setup request message, that the circuit domain service is a non-voice service.

Optionally, the determining, by the MSC, whether the circuit domain service is a non-voice service may include:

determining, by the MSC according to a type of the circuit domain service, that the circuit domain service is a non-voice service.

The method may further include:

sending, by the MSC, a service connection setup request message to the UE, where the service connection setup request message indicates that the circuit domain service is a non-voice service.

S290: After the MSC receives the handover complete message or after the MSC sends the service connection setup request message, the MSC sends a session release message (such as a Disconnect message) to the UE, where the session release message is used to request the UE to release a session that was generated in a process in which the UE was handed over from the LTE network to the CS domain of the 2G or 3G network.

The UE receives the session release message sent by the MSC. The session release message is used to request the UE to release a voice session that was generated in the process in which the UE was handed over from the LTE network to the CS domain of the 2G or 3G network.

After the UE receives the session release message sent by the MSC, the UE sends a session release request message (such as a Release message).

After receiving the session release request message, the MSC sends a session release request complete message (such as a Release complete message).

S296: The MSC sends a bearer release message to the BSC/RNC, so as to release the voice resource of the CS domain that is allocated in step S221 by the base station for the handover of the UE to the CS domain of the 2G or 3G network.

The base station of the 2G or 3G network sends a bearer release message to the UE, so as to release the voice resource of the CS domain that is allocated by the base station for the handover of the UE to the CS domain of the 2G or 3G network.

After a call is ended, because the call is triggered by the CSFB, the UE needs to return to the LTE network after the call is completed. The base station determines, according to the third handover request message, that the call is triggered by the CSFB. Therefore, after the base station of the 2G or 3G network receives a call release message sent by the MSC, the base station of the 2G or 3G network redirects the UE to the LTE network, or the base station hands over the UE to the LTE network. The call release message is a release command Iu Release Command or a clear command Clear Command.

It should be noted that in this embodiment, the base station may parse CS signaling between the UE and the MSC. The base station receives a signaling message that is sent by the UE to the MSC, such as a call acknowledgement message, an authentication response, a second CS call connection setup request message, or another signaling message. The base station may send the signaling message to the MSC by using a connection that is set up in a process of the handover from the LTE network to the CS domain of the 2G or 3G network, or send the signaling message to the MSC by using a direct transfer message.

In this embodiment, the indication information, second indication information, third indication information, fourth indication information, and fifth indication information that are included in the notification message each may include a CSFB indicator field, or a CSFB indicator field and a UE capability field. The CSFB indicator field instructs the MME to hand over, for the CSFB, the UE from the LTE network to the circuit switched CS domain of the 2G or 3G network. The UE capability field represents that the UE supports the handover from the LTE network to the PS domain of the 2G or 3G network.

During implementation of a circuit switched fallback for a non-voice service, a handover of UE from an LTE network to a CS domain of a 2G or 3G network is not triggered, or a handover of UE from an LTE network to a CS domain of a 2G or 3G network is triggered. When the UE is moved to the CS domain of the 2G or 3G network, a voice resource reserved in the CS domain of the 2G or 3G network is released, thereby saving precious voice resources.

In the foregoing two application scenarios, the whole network handover and session process is described separately from two aspects: when the UE initiates a call and when the UE is called.

Figure 3:
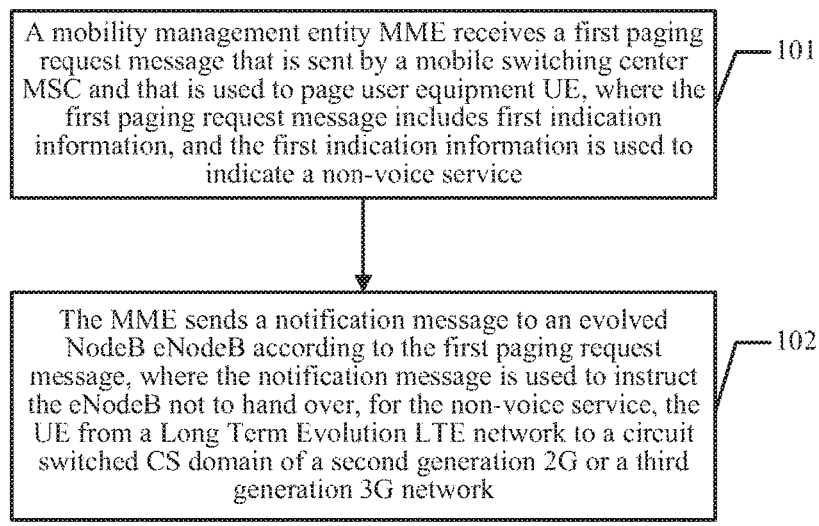
FIG. 3 is a schematic diagram of another embodiment of a voice resource saving method according to the embodiments of the present invention.

Referring to FIG. 3, an embodiment of a voice resource saving method according to the embodiments of the present invention includes:

101: A mobility management entity MME receives a first paging request message that is sent by a mobile switching center MSC and that is used to page a user equipment UE, where the first paging request message includes first indication information, and the first indication information is used to indicate a non-voice service.

102: The MME sends a notification message to an evolved NodeB eNodeB according to the first paging request message, where the notification message is used to instruct the eNodeB not to hand over, for the non-voice service, the UE from a Long Term Evolution LTE network to a circuit switched CS domain of a second generation 2G or a third generation 3G network.

The method shown in FIG. 3 further includes:

sending, by the MME, a second paging request message to the UE; and receiving, by the MME, a service request sent by the UE, where the service request is used to request a circuit switched fallback CSFB for a circuit domain service.

For detailed descriptions of the foregoing processing steps performed by the MME and other processing steps in this embodiment, refer to the description in the embodiment corresponding to FIG. 2a. Details are not described herein again.

Figure 4:
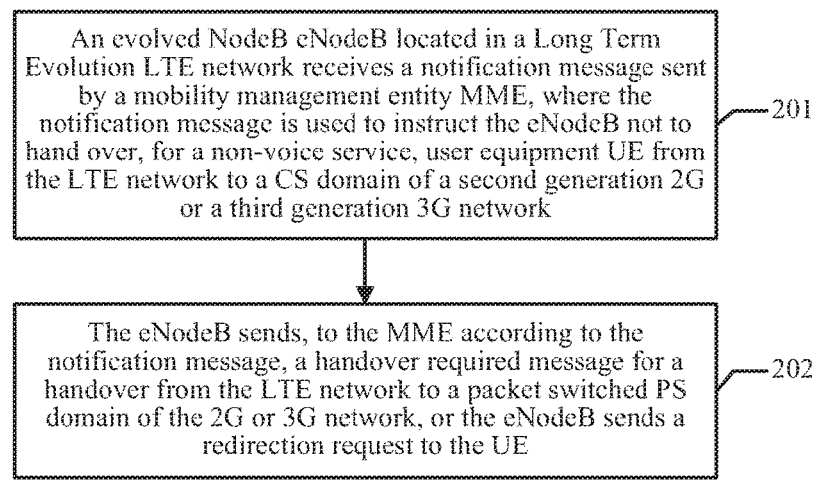
FIG. 4 is a schematic diagram of another embodiment of a voice resource saving method according to the embodiments of the present invention.

Referring to FIG. 4, another embodiment of a voice resource saving method according to the embodiments of the present invention includes:

201: An evolved NodeB eNodeB located in a Long Term Evolution LTE network receives a notification message sent by a mobility management entity MME, where the notification message is used to instruct the eNodeB not to hand over, for a non-voice service, a user equipment UE from the LTE network to a CS domain of a second generation 2G or a third generation 3G network.

202: The eNodeB sends, to the MME according to the notification message, a handover required message for a handover from the LTE network to a packet switched PS domain of the 2G or 3G network, or the eNodeB sends a redirection request to the UE.

For detailed descriptions of the foregoing processing steps performed by the evolved NodeB and other processing steps in this embodiment, refer to the description in the embodiment corresponding to FIG. 2a. Details are not described herein again.

Figure 5:
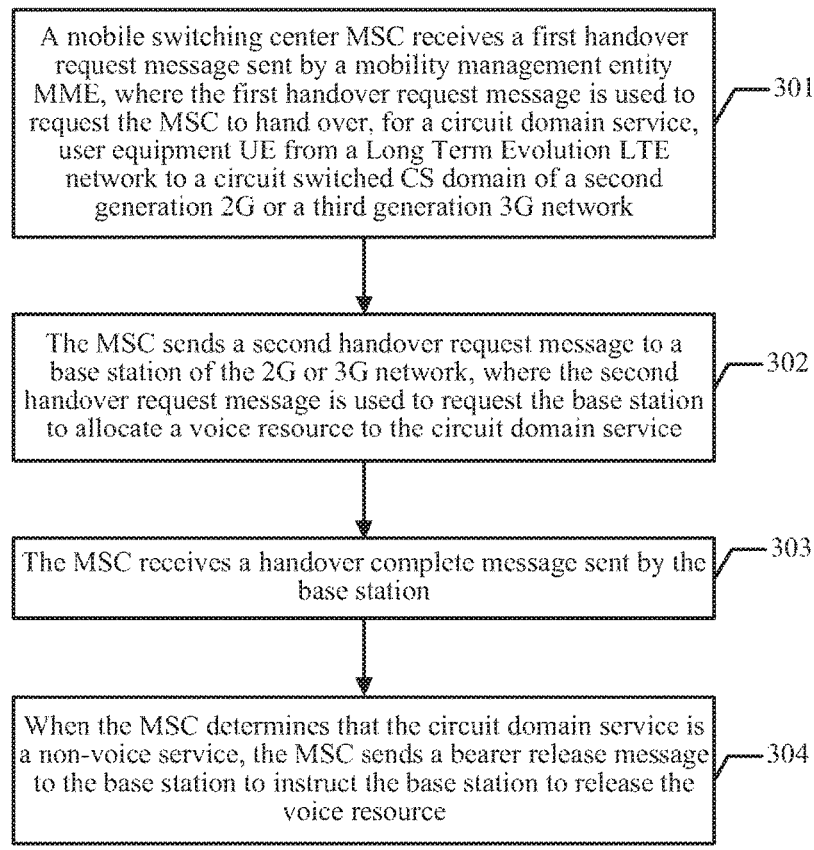
FIG. 5 is a schematic diagram of another embodiment of a voice resource saving method according to the embodiments of the present invention.

Referring to FIG. 5, another embodiment of a voice resource saving method according to the embodiments of the present invention includes:

301: A mobile switching center MSC receives a first handover request message sent by a mobility management entity MME, where the first handover request message is used to request the MSC to hand over, for a circuit domain service, a user equipment UE from a Long Term Evolution LTE network to a circuit switched CS domain of a second generation 2G or a third generation 3G network.

302: The MSC sends a second handover request message to a base station of the 2G or 3G network, where the second handover request message is used to request the base station to allocate a voice resource to the circuit domain service.

303: The MSC receives a handover complete message sent by the base station.

304: When the MSC determines that the circuit domain service is a non-voice service, the MSC sends a bearer release message to the base station to instruct the base station to release the voice resource.

The method shown in FIG. 5 further includes:

receiving, by the MSC, a service connection setup request message sent by the UE, where the service connection setup request message indicates that the circuit domain service is a non-voice service; and the determining, by the MSC, whether the circuit domain service is a non-voice service includes:

determining, by the MSC according to the service connection setup request message, that the circuit domain service is a non-voice service.

The determining, by the MSC, whether the circuit domain service is a non-voice service includes:

determining, by the MSC according to a type of the circuit domain service, that the circuit domain service is a non-voice service; and the method further includes:

sending, by the MSC, a service connection setup request message to the UE, where the service connection setup request message indicates that the circuit domain service is a non-voice service.

When the MSC determines that the circuit domain service is a non-voice service, the MSC sends a session release message to the UE, where the session release message is used to request the UE to release a voice session that was generated in a process in which the UE was handed over from the LTE network to the CS domain of the 2G or 3G network.

For detailed descriptions of the foregoing processing steps performed by the UE and other processing steps in this embodiment, refer to the descriptions in the embodiments corresponding to FIG. 1 and FIG. 2*b*. Details are not described herein again.

Figure 6:
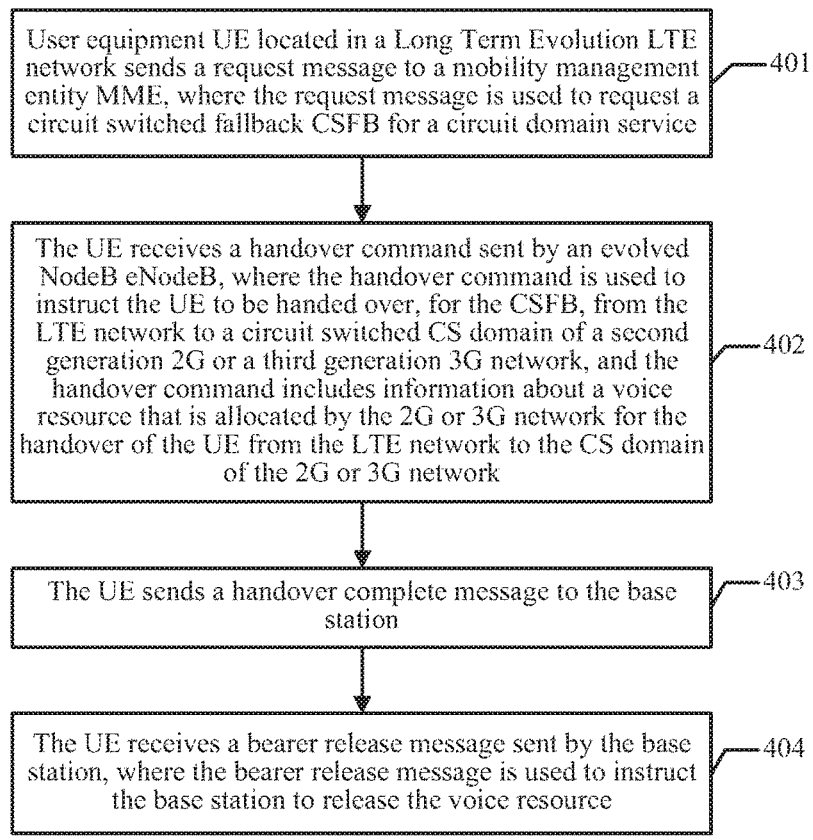
FIG. 6 is a schematic diagram of another embodiment of a voice resource saving method according to the embodiments of the present invention.

Referring to FIG. 6, another embodiment of a voice resource saving method according to the embodiments of the present invention includes:

401: A user equipment UE located in a Long Term Evolution LTE network sends a request message to a mobility management entity MME, where the request message is used to request a circuit switched fallback CSFB for a circuit domain service.

402: The UE receives a handover command sent by an evolved NodeB eNodeB, where the handover command is used to instruct the UE to be handed over, for the CSFB, from the LTE network to a circuit switched CS domain of a second generation 2G or a third generation 3G network, and the handover command includes information about a voice resource that is allocated by the 2G or 3G network for the handover of the UE from the LTE network to the CS domain of the 2G or 3G network.

403: The UE sends a handover complete message to a base station in the 2G or 3G network.

404: The UE receives a bearer release message sent by the base station, where the bearer release message is used to instruct the base station to release the voice resource.

The method shown in FIG. 6 may further include:

after the sending, by the UE, a handover complete message to the base station, and before the receiving, by the UE, a bearer release message sent by the base station, sending, by the UE, a service connection setup request message to the MSC, where the service connection setup request message indicates that the circuit domain service is a non-voice service, or receiving, by the UE, a service connection setup request message sent by the MSC, where the service connection setup request message indicates that the circuit domain service is a non-voice service.

receiving, by the UE, a session release message sent by the MSC, where the session release message is used to request the UE to release a voice session that was generated in a process in which the UE was handed over from the LTE network to the CS domain of the 2G or 3G network.

For detailed descriptions of the foregoing processing steps performed by the UE and other processing steps in this embodiment, refer to the descriptions in the embodiments corresponding to FIG. 1 and FIG. 2*b*. Details are not described herein again.

Figure 7:
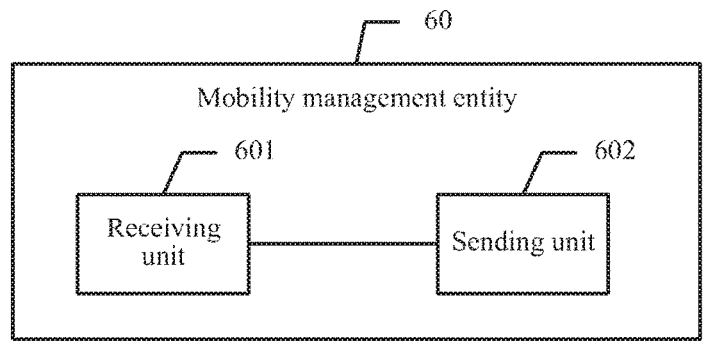
FIG. 7 is a schematic diagram of an embodiment of a mobility management entity according to the embodiments of the present invention.

Referring to FIG. 7, a mobility management entity MME 60 provided in an embodiment of the present invention includes: a receiving unit 601 and a sending unit 602.

The receiving unit 601 is configured to receive a first paging request message that is sent by a mobile switching center MSC and that is used to page a user equipment UE, where the first paging request message includes first indication information, and the first indication information is used to indicate a non-voice service.

The sending unit 602 is configured to send a notification message to an evolved NodeB eNodeB according to the first paging request message received by the receiving unit 601, where the notification message is used to instruct the eNodeB not to hand over, for the non-voice service, the UE from a Long Term Evolution LTE network to a circuit switched CS domain of a second generation 2G or a third generation 3G network.

The sending unit 602 is further configured to send a second paging request message to the UE.

The receiving unit 601 is further configured to receive a service request sent by the UE, where the service request is used to request a circuit switched fallback CSFB for a circuit domain service.

The notification message includes second indication information, and the second indication information is used to indicate the non-voice service.

The mobility management entity in this embodiment may perform method steps performed by the MME as described in the method embodiments of FIG. 2*a* and FIG. 3. The receiving unit 601 is configured to receive a message that is sent by another entity to the MME, and the sending unit 602 is configured to send a message to the another entity. A person skilled in the art may understand behaviors of the units in the MME, actions executed by the units in the MME, and a relationship between the units according to the steps executed in these method embodiments.

Figure 8:
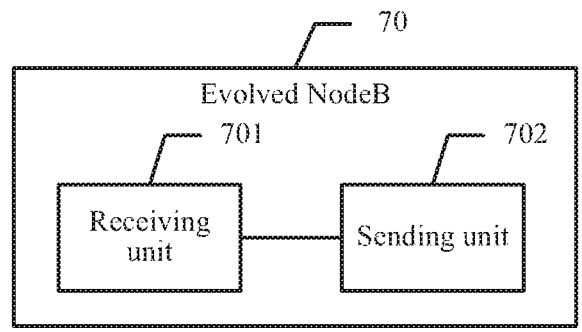
FIG. 8 is a schematic diagram of an embodiment of an evolved NodeB according to the embodiments of the present invention.

Referring to FIG. 8, an evolved NodeB 70 provided in an embodiment of the present invention includes: a receiving unit 701 and a sending unit 702.

The receiving unit 701 is configured to receive a notification message sent by a mobility management entity MME, where the notification message is used to instruct the eNodeB not to hand over, for a non-voice service, a user equipment UE from a Long Term Evolution LTE network to a CS domain of a second generation 2G or a third generation 3G network.

The sending unit 702 is configured to send, to the MME according to the notification message received by the receiving unit, a handover required message for a handover from the LTE network to a packet switched PS domain of the 2G or 3G network, or send a redirection request to the UE.

The notification message includes second indication information, and the second indication information is used to indicate the non-voice service.

The evolved NodeB in this embodiment may perform method steps performed by the evolved NodeB as described in the method embodiments of FIG. 2a and FIG. 4. The receiving unit 701 is configured to receive a message that is sent by another entity to the evolved NodeB. A person skilled in the art may understand behaviors of the units in the evolved NodeB, actions executed by the units in the evolved NodeB, and a relationship between the units according to the steps executed in these method embodiments.

Figure 9:
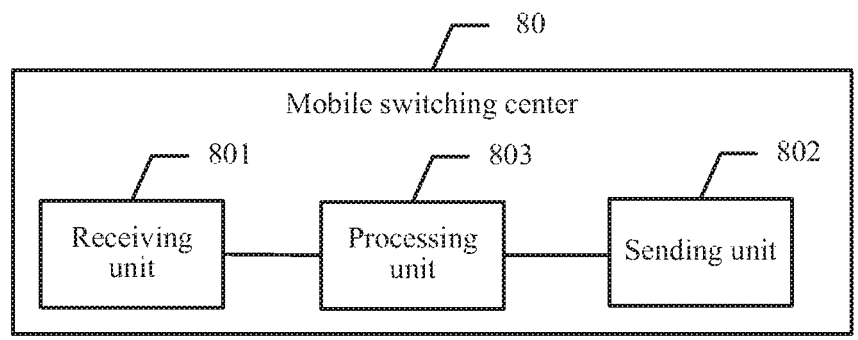
FIG. 9 is a schematic diagram of an embodiment of a mobile switching center according to the embodiments of the present invention.

Referring to FIG. 9, a mobile switching center MSC 80 provided in an embodiment of the present invention includes: a receiving unit 801, a sending unit 802, and a processing unit 803.

The receiving unit 801 is configured to receive a first handover request message sent by a mobility management entity MME, where the first handover request message is used to request the MSC to hand over, for a circuit domain service, a user equipment UE from a Long Term Evolution LTE network to a circuit switched CS domain of a second generation 2G or a third generation 3G network.

The sending unit 802 is configured to send a second handover request message to a base station of the 2G or 3G network, where the second handover request message is used to request the base station to allocate a voice resource to the circuit domain service.

The receiving unit 801 is further configured to receive a handover complete message sent by the base station.

The processing unit 803 is configured to: after the receiving unit 801 receives the handover complete message, determine whether the circuit domain service is a non-voice service.

The sending unit 802 is configured to: when the processing unit 803 determines that the circuit domain service is a non-voice service, send a bearer release message to the base station to instruct the base station to release the voice resource.

The receiving unit 801 is further configured to receive a service connection setup request message sent by the UE, where the service connection setup request message indicates that the circuit domain service is a non-voice service.

The processing unit 803 is configured to determine, according to the service connection setup request message received by the receiving unit 801, that the circuit domain service is a non-voice service.

The processing unit 803 is configured to determine, according to a type of the circuit domain service, that the circuit domain service is a non-voice service.

The sending unit 802 is further configured to send a service connection setup request message to the UE, where the service connection setup request message indicates that the circuit domain service is a non-voice service.

The sending unit 802 is further configured to: when the processing unit 803 determines that the circuit domain service is a non-voice service, send a session release message to the UE, where the session release message is used to request the UE to release a voice session that was generated in a process in which the UE was handed over from the LTE network to the CS domain of the 2G or 3G network.

The MSC in this embodiment may perform method steps performed by the MSC as described in the method embodiments of FIG. 1, FIG. 2b, and FIG. 5. The receiving unit 801 is configured to receive a message that is sent by another entity to the MSC, and the sending unit 803 is configured to send a message to the another entity. A person skilled in the art may understand behaviors of the units in the MSC, actions executed by the units in the MSC, and a relationship between the units according to the steps executed in these method embodiments.

Figure 10:
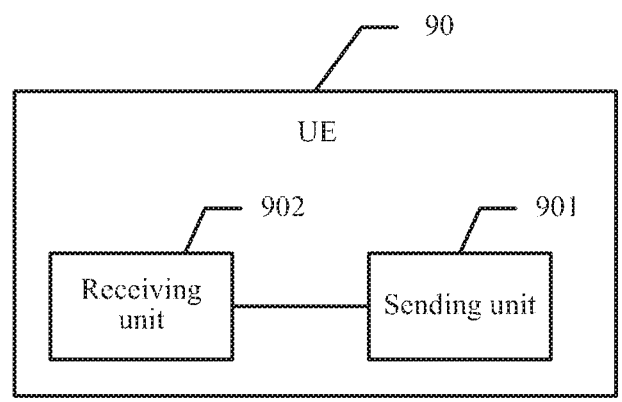
FIG. 10 is a schematic diagram of an embodiment of user equipment according to the embodiments of the present invention.

Referring to FIG. 10, user equipment 90 provided in an embodiment of the present invention includes: a sending unit 901 and a receiving unit 902.

The sending unit 901 is configured to send a request message to a mobility management entity MME, where the request message is used to request a circuit switched fallback CSFB for a circuit domain service.

The receiving unit 902 is configured to receive a handover command sent by an evolved NodeB eNodeB, where the handover command is used to instruct the UE to be handed over, for the CSFB, from the LTE network to a circuit switched CS domain of a second generation 2G or a third generation 3G network, and the handover command includes information about a voice resource that is allocated by the 2G or 3G network for the handover of the UE from the LTE network to the circuit switched CS domain of the 2G or 3G network.

The sending unit 901 is further configured to send a handover complete message to a base station in the 2G or 3G network.

The receiving unit 902 is further configured to receive a bearer release message sent by the base station, where the bearer release message is used to instruct the base station to release the voice resource.

The sending unit 901 is further configured to: after the handover complete message is sent to the base station, and before the receiving unit receives the bearer release message sent by the base station of the 2G or 3G network, send a service connection setup request message to the MSC, where the service connection setup request message indicates that the circuit domain service is a non-voice service, or the receiving unit 902 is further configured to: after the sending unit 901 sends the handover complete message to the base station, and before the bearer release message sent by the base station is received, receive a service connection setup request message sent by the MSC, where the service connection setup request message indicates that the circuit domain service is a non-voice service.

The receiving unit 902 is further configured to receive a session release message sent by the MSC, where the session release message is used to request the UE to release a voice session that was generated in a process in which the UE was handed over from the LTE network to the CS domain of the 2G or 3G network.

The UE in this embodiment may perform method steps performed by the UE as described in the method embodiments of FIG. 1, FIG. 2b, and FIG. 6. The receiving unit 902 is configured to receive a message that is sent by another entity to the UE, and the sending unit 901 is configured to send a message to the another entity. A person skilled in the art may understand behaviors of the units in the UE, actions executed by the units in the UE, and a relationship between the units according to the steps executed in these method embodiments.

By means of the foregoing apparatus embodiment provided in the present invention, during implementation of a circuit switched fallback for a non-voice service, a handover of UE from an LTE network to a CS domain of a 2G or 3G network is not triggered, or a handover of UE from an LTE network to a CS domain of a 2G or 3G network is triggered, and when the UE is moved to the CS domain of the 2G or 3G network, a voice resource reserved in the CS domain of the 2G or 3G network is released, thereby saving voice resources.

A person skilled in the art may understand that in the foregoing embodiments of FIG. 7 to FIG. 10, the sending unit configured to send a message may be implemented as a transmitter, and the receiving unit configured to receive a message may be implemented as a receiver. Alternatively, the sending unit and the receiving unit may be both implemented as a transceiver. In physical implementation, the transmitter or the transceiver may be implemented as one physical entity, or may be implemented as multiple physical entities; and the transmitter and the transceiver may be implemented as one physical entity, or may be implemented as multiple physical entities, which are not limited in the present invention. The processing unit may be implemented as one or more processors, which is not limited in the present invention.

Figure 11:
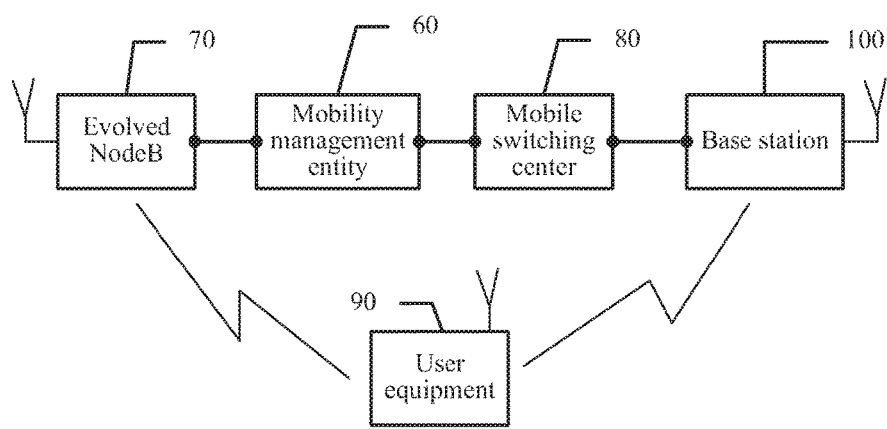
FIG. 11 is a schematic diagram of an embodiment of a voice resource saving system according to the embodiments of the present invention.

Referring to FIG. 11, an embodiment of a network handover system provided in the embodiments of the present invention includes: a mobility management entity 60, an evolved NodeB 70, a mobile switching center 80, a base station 100, and user equipment 90.

For actions respectively executed by the mobility management entity 60, the evolved NodeB 70, the mobile switching center 80, the base station 100, and the user equipment 90 and interactions between them, refer to the description in FIG. 2a and the descriptions of the method embodiments and the apparatus embodiments in FIG. 3, FIG. 4, FIG. 7, and FIG. 8. Details are not described herein again.

Alternatively, for the mobility management entity 60, the evolved NodeB 70, the mobile switching center 80, the base station 100, and the user equipment 90 and interactions between them, refer to the descriptions in FIG. 1 and FIG. 2b and the descriptions of the method embodiments and the apparatus embodiments in FIG. 5, FIG. 6, FIG. 9, and FIG. 10. Details are not described herein again.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The LTE network provided in the embodiments includes an LTE A network, and a network of an LTE release that may appear subsequently.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A voice resource saving method, comprising:
receiving, by a mobility management entity (MME) from a mobile switching center (MSC), a first paging request message that is used to page a user equipment (UE), wherein the first paging request message comprises first indication information indicating a non-voice service, wherein the non-voice service comprises one of a location service (LCS) or an unstructured supplementary service data (USSD);

sending, by the MME, a second paging message to the UE indicating the non-voice service;

receiving, by the MME, from the UE, a message containing an extended service request to request a circuit switched (CS) fallback (CSFB) to perform the non-voice service;

sending, by the MME, a notification message to an evolved NodeB (eNodeB) in response to the message containing the extended service request, wherein the notification message instructs the eNodeB not to hand over, for the non-voice service, the UE from a Long Term Evolution (LTE) network to a circuit switched (CS) domain of a second generation (2G) or a third generation (3G) network;

receiving, by the MME from the eNodeB, a message indicating that handover of the UE is required to perform the non-voice service; and sending, by the MME to the eNodeB, a handover required response message that includes information about radio resources of the CS domain that the eNodeB uses to command the UE to either be handed over from a Long Term Evolution (LTE) network to a packet switched (PS) domain of the 2G or 3G network, or the UE is to be moved from the LTE network to the 2G or 3G network by a redirection procedure, wherein a voice resource is released in response to the UE being handed over or moved from the LTE network to the 2G or 3G network.

2. The method according to claim 1, wherein the notification message comprises second indication information indicating the non-voice service.

3. The method according to claim 2, further comprising:
sending, by the MME, a second paging request message to the UE; and
receiving, by the MME, a service request from the UE, wherein the service request is used to request a circuit switched fallback (CSFB) for a circuit domain service.

4. The method according to claim 1 wherein completion of the handover from the LTE network to the CS domain of the 2G or 3G network to perform the non-voice service results in a bearer release being sent by the MSC to a base station to release voice resources.

5. The method according to claim 1, further comprising:
receiving, by the eNodeB located in the LTE network, the notification message from the MME; and
sending, by the eNodeB to the MME in response to the notification message, a handover required message for handing over the UE from the LTE network to a packet switched (PS) domain of the 2G or 3G network.

6. The method according to claim 1, further comprising:
receiving, by the eNodeB located in the LTE network, the notification message from the MME; and
sending, by the eNodeB in response to the notification message, a redirection request to the UE.

7. A mobility management entity (MME), comprising:
a receiver, configured to receive, from a mobile switching center (MSC), a first paging request message that is used to page a user equipment (UE), wherein the first paging request message comprises first indication information indicating a non-voice service, wherein the non-voice service comprises one of a location service (LCS) or an unstructured supplementary service data (USSD);

a transmitter, configured to send a second paging request to the UE indicating the non-voice service;

the receiver further configured to receive a service request from the UE to request a circuit switched fallback (CSFB) to perform the non-voice service;

the transmitter further configured to send a notification message to an evolved NodeB (eNodeB) in response to the received message containing the extended service request, wherein the notification message instructs the eNodeB not to hand over, for the non-voice service, the UE from a Long Term Evolution (LTE) network to a circuit switched (CS) domain of a second generation (2G) or a third generation (3G) network;

the receiver further configured to receive, from the eNodeB, a message indicating that handover of the UE is required to perform the non-voice service; and the transmitter further configured to send, to the eNodeB, a handover required response message that includes information about radio resources of the CS domain that the eNodeB uses to command the UE to either be handed over from a Long Term Evolution (LTE) network to a packet switched (PS) domain of the 2G or 3G network, or the UE is to be moved from the LTE network to the 2G or 3G network by a redirection procedure, wherein a voice resource is released in response to the UE being handed over or moved from the LTE network to the 2G or 3G network.

8. The MME according to claim 7, wherein the notification message comprises second indication information indicating the non-voice service.

9. The MME according to claim 8, wherein
the transmitter is further configured to send a second paging request message to the UE; and
the receiver is further configured to receive a service request from the UE, wherein the service request is used to request a circuit switched fallback (CSFB) for a circuit domain service.

10. The MME according to claim 7, wherein completion of the handover from the LTE network to the CS domain of the 2G or 3G network to perform the non-voice service results in a bearer release being sent by the MSC to a base station to release voice resources.

11. A voice resource saving system, comprising:
a mobility management entity (MME), that receives, from a mobile switching center (MSC), a first paging request message that is used to page a user equipment (UE), wherein the first paging request message comprises first indication information indicating a non-voice service, wherein the non-voice service comprises one of a location service (LCS) or an unstructured supplementary service data (USSD); the MME sends a second paging request to the UE indicating the non-voice service; the MME receives a service request from the UE to request a circuit-switched fallback (CSFB) to perform the non-voice service; and the MME sends a notification message to an evolved NodeB (eNodeB) in response to the message containing the extended service request, wherein the notification message instructs the eNodeB not to handover, for the non-voice service, the UE from a Long Term Evolution (LTE) network to a circuit switched (CS) domain of a second generation (2G) or a third generation (3G) network;

the evolved NodeB (eNodeB), that receives the notification message from the MME indicating that handover of the UE is required to perform the non-voice service; and the MME sends to the eNodeB, in response to the received notification message, a redirection request to the UE, or a handover required message to the MME for a handover from a Long Term Evolution (LTE) network to a packet switched (PS) domain or a circuit switched domain of the 2G or 3G network, wherein a voice resource is released in response to the UE being handed over or moved from the LTE network to the 2G or 3G network.

12. The system according to claim 11, wherein the notification message is used to instruct the eNodeB not to hand over, for the non-voice service, the UE from the LTE network to a circuit switched (CS) domain of the 2G or 3G network.

13. The system according to claim 11, wherein the notification message comprises second indication information indicating the non-voice service.

14. The system according to claim 11, wherein completion of the handover from the LTE network to the CS or PS domain of the 2G or 3G network to perform the non-voice service results in a bearer release being sent by the MSC to a base station to release voice resources.

\* \* \* \* \*